United States Patent [19]
Ashworth et al.

[11] Patent Number: 4,652,433
[45] Date of Patent: Mar. 24, 1987

[54] METHOD FOR THE RECOVERY OF MINERALS AND PRODUCTION OF BY-PRODUCTS FROM COAL ASH

[75] Inventors: Robert A. Ashworth, Tampa; Larry A. Rodriguez, St. Petersburg; Antonio A. Padilla, Tampa; Ned B. Spake, Winter Park; W. Wes Berry, Brandon, all of Fla.; Rae A. Schmeda, Littleton, Colo.

[73] Assignee: Florida Progress Corporation, St. Petersburg, Fla.

[21] Appl. No.: 823,538

[22] Filed: Jan. 29, 1986

[51] Int. Cl.$^4$ ............................ C01F 7/00; C01G 49/00
[52] U.S. Cl. ..................................... 423/112; 423/113; 423/122; 423/126; 423/132; 423/139; 423/140; 423/150; 423/493; 423/495; 423/625; 423/632; 423/633; 75/101 R; 75/101 BE; 75/114; 75/121; 209/10; 209/172.5; 209/164; 209/214
[58] Field of Search ................ 75/2, 101 R, 101 BE, 75/114, 121; 423/111, 112, 113, 122, 126, 132, 139, 140, 150, 493, 625, 495, 633, 632; 209/10, 172.5, 214, 164

[56]  References Cited
U.S. PATENT DOCUMENTS

| 2,174,825 | 10/1939 | Freling et al. | 423/132 |
| 4,242,313 | 12/1980 | Torma | 423/112 |
| 4,243,640 | 1/1981 | Hill et al. | 423/132 |
| 4,252,777 | 2/1981 | McDowell et al. | 423/112 |
| 4,319,988 | 3/1982 | Aldrich | 209/214 |

FOREIGN PATENT DOCUMENTS

0019343  2/1982  Japan .................................. 423/126

Primary Examiner—John Doll
Assistant Examiner—Robert L. Stoll
Attorney, Agent, or Firm—James W. Hellwege

[57] ABSTRACT

The method of the present invention is a novel comprehensive process for maximizing the recovery of valuable mineral values from coal ash. Options may also be included for the production of saleable inorganic chemical by-products. The process employs both physical and chemical extraction techniques that maximize the yield of products while reducing the quantity of waste produced. Valuable minerals and chemicals such as cenospheres (hollow microspheres), carbon, magnetite ($Fe_3O_4$), alumina ($Al_2O_3$), iron oxide ($Fe_2O_3$) and iron chloride ($FeCl_3$) may be produced. Due to removal of carbon, magnetite, and iron oxide from the coal ash, the processed ash comprises a quality pozzolan.

19 Claims, 7 Drawing Figures

METHOD FOR THE RECOVERY OF MINERALS AND PRODUCTION OF BY-PRODUCTS FROM COAL ASH

BACKGROUND OF THE INVENTION

The present invention relates to a method of extracting valuable minerals and elements from coal ash using both physical and chemical separation techniques. The method is particularly applicable for processing fly ash derived from entrained flow coal gasification and pulverized coal combustion operations.

For decades various researchers have investigated means for extraction of minerals and elements from fly ash. Some techniques have been promulgated to initiate new business opportunities while others are due solely to environmental concerns associated with landfill disposal of certain coal ashes.

Most of the state-of-the-art processes have concentrated on the recovery of one or perhaps two minerals or elements from fly ash either using physical separation techniques or chemical separation techniques, but rarely combining the two.

U.S. Pat. No. 4,319,988 (issued to Aldrich) describes a method for recovering magnetite ($Fe_3O_4$) from coal ash using a combination of dry and wet magnetic separation. U.S. Pat. No. 4,121,945 (issued to Hurst et al) describes a physical recovery process using water to facilitate such separation. In the Hurst et al process, carbon, cenospheres, iron concentrate, enhanced pozzolans, and inert mineral fillers are produced. U.S. Pat. No. 4,242,313 (issued to Torma) describes a process for the recovery of alumina from fly ash via high temperature lime pretreatment to increase the depth of aluminum extraction, followed by treatment with sulfuric acid, solvent extraction of aluminum sulfate and subsequent calcination of the aluminum sulfate to yield alumina. U.S. Pat. Nos. 4,252,777 and 4,254,088 (issued to McDowell and Seeley) describe methods for improving the acid leachability of aluminum and other metals such as iron, titanium, uranium, and thorium from fly ash via high temperature alkali pretreatment of the ash. U.S. Pat. No. 4,243,640 (issued to Hill et al) describes a means of extracting aluminum from fly ash using a nitric acid leach process. U.S. Pat. No. 2,244,761 (issued to Hixson et al) describes a method for recovering aluminum via counter-current leaching with hydrochloric acid, followed by solvent extraction to remove fabric chloride from the acid leaching media. The leach solution containing aluminum chloride is then evaporated to form hydrated aluminum chloride crystals which are then thermally decomposed to form aluminum oxide.

Canon, Gilliam and Watson of Oak Ridge National Laboratories have done considerable work on the acid extraction of aluminum from fly ash using a variety of techniques such as direct acid leach and pressurized acid digestion, which process includes a hot sodium hydroxide pretreatment step to increase the acid leachability of aluminum from the fly ash. Burnett, Dunker and Murtha of Ames Laboratory have also done considerable work on various minerals recovery from fly ash techniques. Ames Laboratory developed the "HiChlor" Process, a chlorination process for the removal of metal chlorides from fly ash via high temperature reaction and vaporization.

The above processes, with the exception of the Aldrich patent, are not believed to have been commercialized. The economics of such processes must necessarily compete with other state-of-the-art methods that process other mineral feedstocks and which are already in commercial operation.

However, it is apparent that the earth's resources are not inexhaustible and that future generations must necessarily look toward unconventional (by today's standards) sources of raw materials to meet future needs. Millions of tons of coal ash are generated each year in all sections of the United States. Coal ash stands ready as an available resource for the production of many metals and compounds thereof and constitutes a preprocessed ore that is readily available.

It would thus be extremely advantageous to provide a method for the economic recovery of mineral values from coal ash. However, such a method must be economically attractive when compared to other state-of-the-art processes which are already in commercialization that use other types of feedstocks.

The present invention incorporates both physical and chemical separation techniques, maximizing saleable products and minimizing energy consumption and waste streams to yield an economically and environmentaly attractive minerals recovery process. It is designed in such a manner that process options exist for the production or deletion of certain products depending on coal ash quality, regional product markets and product selling prices. Whereas other processes have concentrated on physical processing or chemical processing to produce a few products from coal ash, no prior processes are believed to have maximized recovery of saleable products through the use of extensive physical separation techniques in conjunction with extensive chemical reaction and chemical separation techniques.

SUMMARY OF THE INVENTION

The scope of the present invention comprises an economical method for the production of acid-leached cenospheres, carbon, magnetite, quality-controlled pozzolans, pure alumina, iron oxide and iron chloride. The process is particularly suitable for the processing of entrained-flow gasifier fly ash and pulverized coal-fired boiler fly ash.

In accordance with the present invention, a method is provided for the recovery of mineral values from ash derived from coal gasification and combustion, which ash contains aluminum, iron, carbon, magnetite and cenospheres, said method comprising the steps of:

(a) screening said ash to provide a first carbon and cenosphere-containing ash fraction which contains the major portion of the cenospheres and carbon present in said ash and a second ash fraction;

(b) separating and recovering cenospheres from said first ash fraction to yield a carbon-containing fraction;

(c) removing and recovering said carbon from said carbon-containing fraction by froth flotation to separate said carbon from mineral values contained in said fraction;

(d) subjecting the fraction produced in step (c) to dry magnetic separation;

(e) subjecting the second ash fraction to wet magnetic separation to produce a third ash fraction;

(f) combining the ash fractions resulting from steps (d) and (e) to provide a combined ash fraction;

(g) leaching mineral values from said combined ash fraction by countercurrent contact of said fraction with a hydrochloric acid solution, said leaching occurring at a temperature in the range of about 70° to 110° C. and at a pressure in the range of about 10 to 20 psia;

(h) contacting the leach solution resulting from step (g) with an ion exchange resin for removal of soluble iron salts from said solution to provide an iron-lean leach solution and recovering said iron from said ion exchange resin in the form of an iron oxide;

(i) concentrating said iron-lean leach solution by removal of water contained therein;

(j) sparging anhydrous hydrochloric acid gas at a temperature in the range of about 60° to 80° C. and a pressure in the range of about 10 to 20 psia through said concentrated iron-lean leach solution to precipitate aluminum chloride therefrom in the form of aluminum chloride hexahydrate and recovering said aluminum chloride hexahydrate;

(k) washing, drying and calcining said recovered aluminum chloride hexahydrate to yield alumina;

(l) washing leached ash produced in said countercurrent leaching step by countercurrent contact with water and recovering said washed ash;

(m) drying said washed ash recovered from step (l) to provide an acid-leached pozzolan;

(n) leaching mineral values from the cenospheres recovered in step (b) with an aqueous leach solution of hydrochloric acid; and (o) recovering said leached cenospheres from said leach solution, washing said recovered cenospheres and drying said recovered cenospheres.

BRIEF DESCRIPTION OF THE DRAWINGS

For a fuller understanding of the nature and objects of the present invention, reference should be made to the following drawings.

DETAILED DESCRIPTION

Fly ash 2 (FIG. 1) derived from entrained flow coal gasification and/or pulverized coal combustion operations is fed to screens or an air classification system 4 for the separation of the major portion of the carbon and cenospheres from the fly ash. For purposes of the present invention, the term fly ash is intended to refer to the ash produced by carbonaceous fuel-fired power station or industrial boilers and gasification processes as well as the ash recovered by means such as electrostatic precipitation from flue gases or stacks associated with such sources. Typically, fly ash comprises major portions of silicon dioxide (e.g., about 40 to 50 percent by weight) and alumina (e.g., about 15 to 30 percent by weight) together with minor amounts of oxides of iron, manganese, calcium, magnesium, titanium and/or potassium, etc.

Figure 1:
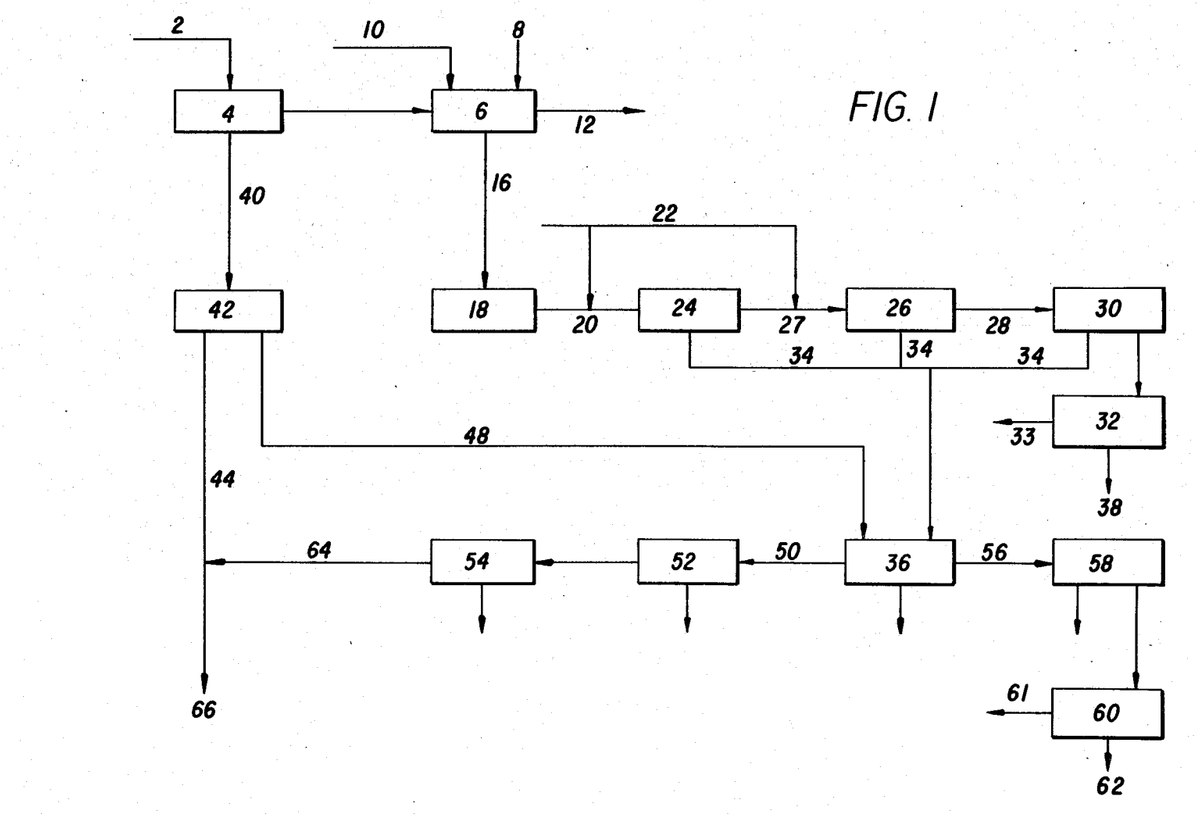
FIGS. 1-3 are schematic depictions of the various process steps of the present invention.

The amount of carbon remaining in the fly ash is determined by reaction kinetics in the coal oxidation process. As a result, most of the carbon is contained in the larger size fraction of the fly ash. Further, with regard to cenospheres, most of these hollow gas-filled quartz-like spheres also are found in the large size fraction of the fly ash. Cenospheres, as currently defined and produced, are subsequently separated from the carbon by water flotation methods in flotation zone 6 as described in greater detail below. In order for a hollow sphere to have a specific gravity less than one so that it will float, the ratio of gas volume to mineral matter in the cenosphere must be fairly large in order to offset the high specific gravity of the mineral matter (which is over twice as great as water).

Figure 4:
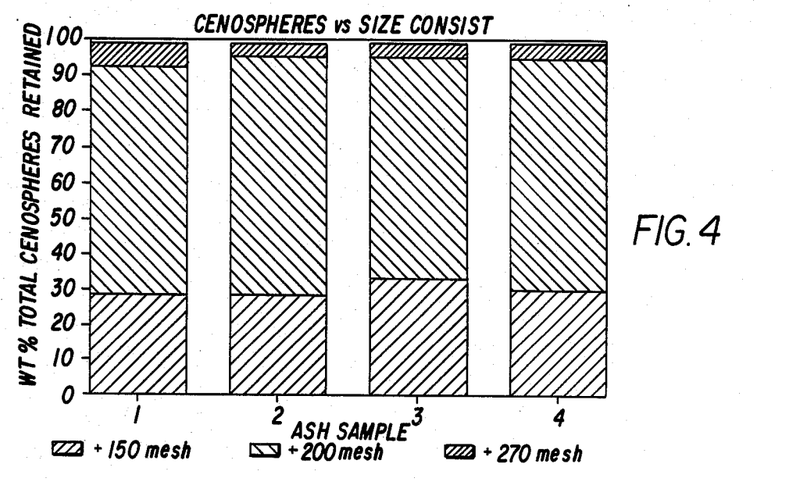
FIG. 4 is a graphical depiction of the relationship between cenosphere content of the fly ash and size consist.
Figure 5:
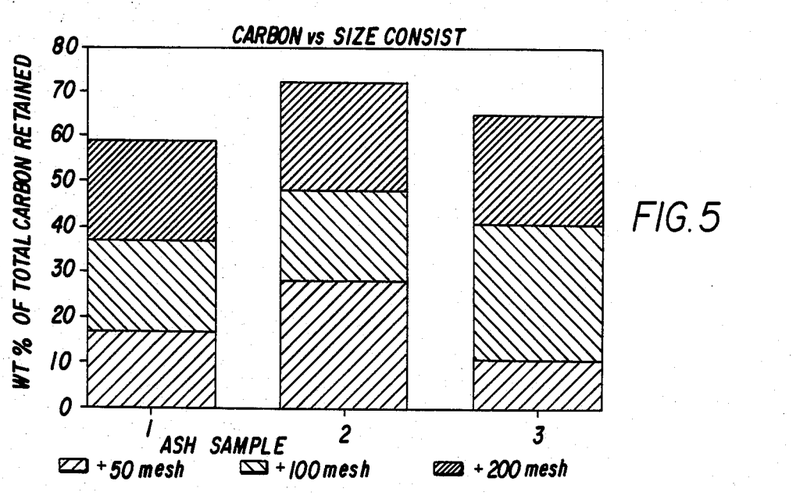
FIG. 5 is a graphical depiction of the relationship between carbon content of the fly ash and size consist.

Distribution of cenospheres and carbon, as a function of ash size consist is shown in FIGS. 4 and 5. It can be seen from the figures, for the ash samples analyzed, that screening of the fly ash through a 200 Tyler mesh screen yields a +200 mesh size fraction that contains at least 90 weight percent of the total cenospheres and at least 60 weight percent of the total carbon contained in the original fly ash samples. Such is surprising since for the same fly ash samples tested, the weight percent of the total fly ash reporting to the +200 mesh size fraction was only 10 to 15 weight percent. The size consist of the mineral ash is dependent on the pulverized coal grind fed to the combustion unit. With pulverized coal gasifiers and combustors, the coal size range is normally 70 to 80 percent −200 mesh. Preferably, the ash is screened such that one fraction of the ash contains at least about 90 percent by weight of the cenospheres present in the ash and at least about 60 percent by weight of the carbon.

The dry +200 mesh cenosphere and carbon-enriched ash fraction is fed to a separation unit 6 consisting of wet mixing followed by gravity separation. Water 8 and a surfactant 10 for the carbon are added to the fly ash to yield a slurry having a solids content of from about 20 to 50 percent by weight, and preferably 40 percent by weight solids. The slurry is then allowed to settle.

Figure 2:
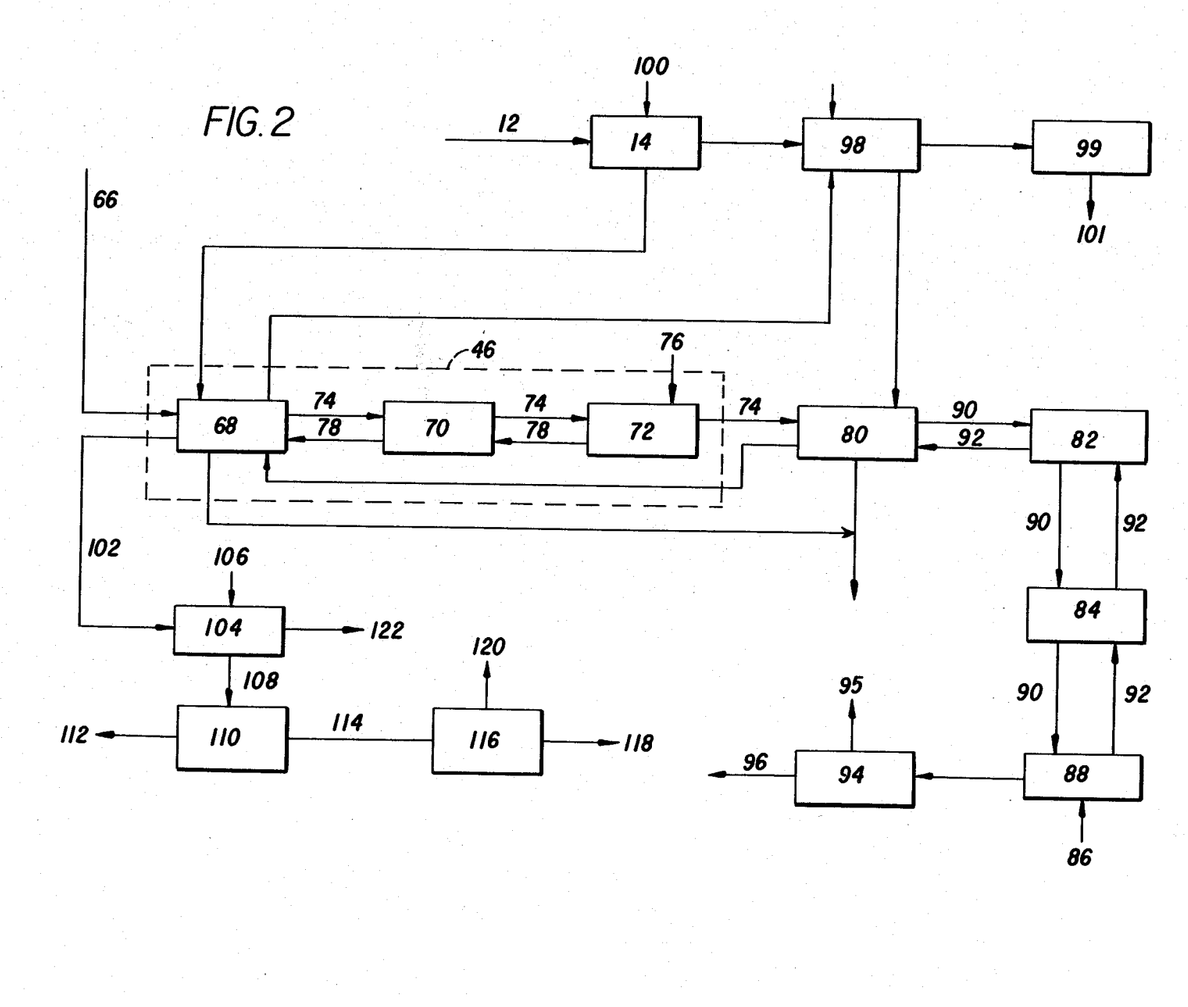

Cenospheres float to the surface of the separator and are skimmed off and fed via stream 12 to a downstream acid leaching zone 14 (see FIG. 2). The settled carbon-containing material 16, is ground in zone 18. The ground material 20 is then fed to a froth flotation unit. An aqueous solution of a frothing agent 22 is added to the ground carbon-containing material and the slurry is then fed in series through two froth flotation cells 24, 26 wherein carbon is froth floated from residual ash mineral matter. Conventional conditioners or frothing agents, such as diesel oil and "Dowfroth 250" (available from Dow Chemical) may be employed to promote the froth separation of the carbon. The frothed carbon 27 from the first flotation cell 24 is mixed with additional water and conditioner, and then is fed to a second flotation cell 26. This in-series operation effects a fairly high carbon purity. While the use of only two flotation cells is depicted, additional cells may be employed in a similar manner.

The carbon 28 frothed from the second cell 26 is fed to a centrifuge 30 for the preliminary separation of water and is then dried in zone 32 to remove residual water 33 from the carbon. The product carbon 38, containing some 80 to 95 percent by weight of carbonaceous matter, can be used as a total or partial replacement for conventional carbon black in formulating certain rubber compounds that do not require a high reinforcement quality.

The analysis for a typical carbon black produced from such processing is shown in Table 1 below:

TABLE 1

| CARBON PRODUCT ANALYSIS | |
|---|---|
| COMPONENT | WT. % |
| Carbonaceous Material | 83.6 |
| $SiO_2$ | 9.0 |
| $Al_2O_3$ | 4.3 |
| $TiO_2$ | 0.2 |
| $Fe_2O_3$ | 0.8 |
| $Fe_3O_4$ | 1.0 |
| CaO | 0.2 |
| MgO | 0.2 |
| $K_2O$ | 0.2 |
| $Na_2O$ | 0.1 |
| $So_3$ | 0.3 |
| $P_2O_5$ | 0.1 |
| TOTAL | 100.0 |

The gangue 34 (settled mineral fraction) recovered from the flotation cells 24, 26 and the centrifuge 30 is fed to a wet magnetic separator 36 for the recovery of an iron-containing fraction in a conventional manner. As an option, the mineral matter from the cells 24, 26 may be wet ground prior to magnetic separation to improve the pozzolanic activity of the ash since the cementatious property of fly ash improves with decreasing particle size.

The −200 mesh ash 40 from the screens of air classifier 4 is fed to a dry magnetic separator 42 for the separation of a magnetic iron-containing fraction in a conventional manner with the remaining non-magnetic fraction 44 being fed to the acid leaching unit 46 (FIG. 2). The magnetic fraction 48 is mixed with the wet underflow 34 from the carbon froth flotation cells 24, 26 and the centrifuge 30 for processing in the wet magnetic separator 36.

The non-magnetic fraction 50 from the separator 36 is preferably thickened and centrifuged in zones 52, 54, respectively, to reduce the water content thereof prior to being fed to the acid leach unit 46. The thickening and centrifuging operations 52, 54 are employed to minimize water dilution to the downstream acid leach unit. The magnetic fraction 56 resulting from the wet magnetic separation and high in magnetite content (some 95 wt. percent $Fe_3O_4$) is centrifuged at zone 58 and dried at zone 60 to remove residual water 61. The magnetite 62 thus recovered from the drying zone 60 is a suitable replacement for conventionally produced magnetite used for dense media separation, e.g., coal cleaning processes.

The non-magnetic ash 64 from the magnetite separation unit is fed to the acid leach unit 46 (FIG. 2) together with non-magnetic fraction 44 as stream 66. Hydrochloric acid is employed as the leaching medium for the dissolution of aluminum, iron, etc., from the fly ash.

The leaching process employed in leaching zone 46 consists of a novel counter-current leach and counter-current wash operation. Leaching takes place at near atmospheric pressure (e.g., at from about 10–20 psia) and at temperatures ranging from 70° C. to 110° C. The leaching process includes a series of leach zones 68, 70, 72. While three leach zones have been depicted, a series of leach zones of from three to five in number are preferably employed.

The ash fraction 74 is passed through the leaching zones 68, 70, 72 in a counter-current manner with respect to the acid leach solution 78 followed by clarification via solids settling and solution decanting. After each leaching step, the ash leachate slurry flows to a clarification step (not shown) where the solids are concentrated to some 60 percent by weight by means such as settlers or hydroclones and subsequently passed to the next downstream leach zone in the series. The clarified solution 78 recovered from each clarifier is passed to the upstream leach zone to serve as the acid leach solution for that zone. By this technique, concentrated hydrochloric acid 76 (i.e., 25 to 35 weight percent HCl) may be fed to the last leach zone 72 in the series to maintain a free acid normality of about 8 normal in the last leach zone.

Such a counter-current operation yields a technique wherein the ash with the lowest aluminum content contacts the strongest acid in the last leach zone 72 in the series. Further, the leach solution leaving the first leach zone 68 is lower in acid concentration than a system that uses co-current leaching. For example, with counter-current leaching with three leach zones in series, for a typical ash, the normality of the last leach zone 72 is generally maintained at about 8 normal, with the normality of the solution leaving the first leach tank 68 being only about 3 normal. With co-current leaching, the normality of the acid solution leaving the first leach zone would be about 8 normal. Lower acid concentrations result in lessened corrosive attack in downstream process units.

The solids from the last-in-series leach tank 72 are clarified and fed to an ash washing zone preferably comprised of a series of ash washing zones 80, 82, 84. The ash washing operation also comprises a counter-current technique wherein the wash water 86 added to a downstream centrifuge 88 flows to the last ash washing zone 84 in series, with water flow 92 for dilution and cooling of the ash being passed counter-current to the ash solids flow 90. Such a wash technique provides several important advantages. First of all, it provides a slurry having a high filtration rate due to decreased salt concentrations in the solution. The slurry being processed by the centrifuge 88 is also low in acid concentration. This permits use of centrifuge equipment of a more simple design than that required for use with slurries of high acid concentrations. The free acid normality of the slurry entering the centrifuge 88 will range from about 2.5 normal to less than about 1 normal depending on the water wash flow and the number of wash steps employed. With counter-current washing, the amount of water required for displacing residual acid from the ash is reduced compared to normal washing practices. Also, the temperature of the slurry entering the centrifuge is lower in comparison to the leach tank temperatures. For example, for a particular ash and water wash quantity, whereas the leach zone solution is preferably maintained at about 90° C., the temperature of the last wash zone in the series will be less than about 50° C.

The above-referenced relationships between the filtration rate and the amount of dissolved salts in the leach liquor-ash slurry is shown in Table 2 below:

TABLE 2

| FILTRATION RATE | |
|---|---|
| Cycle | Filtration Time Seconds |
| I. Ash/Fresh 36% HCl | 170 |

TABLE 2-continued
FILTRATION RATE

| Cycle | Filtration Time Seconds |
|---|---|
| II. Ash/Leachate From Cycle I | 345 |
| III. Ash/Leachate From Cycle II | 954 |

The increase in filtration rate results from an increase in the concentration of metallic salts in solution which causes an increase in liquid viscosity. This is depicted in Table 2 as each successive co-current leaching step increases the concentration of metallic salts in the resulting leachate, resulting in a corresponding exponential increase in the filtration rate for each successive leachate.

With counter-current washing, the concentration of metallic salts in the solution entering the solids separation unit, filter, centrifuge, etc. is minimized, thus yielding a slurry exhibiting desirably high filtration rates. As a result, the concentration of metallic salts in the solution recovered from the countercurrent washing step preferably ranges from about 0.5 to about 3.0 percent by weight.

The washed ash is centrifuged and dried in zone 94 to remove residual water 95 and yield a quality controlled pozzolan 96, ready for use in, for example, concrete admixtures. Table 3 shows the characteristics of pozzolans processed according to the present invention in comparison to pozzolans which have not been so-processed:

TABLE 3
TYPICAL POZZOLAN PRODUCT ANALYSIS

| Component Wt. % | Raw Pozzolan | Processed Pozzolan |
|---|---|---|
| $SiO_2$ | 52.98 | 67.62 |
| $Al_2O_3$ | 24.77 | 24.98 |
| $TiO_2$ | 0.99 | 1.26 |
| $Fe_2O_3$ | 4.82 | 1.78 |
| $Fe_3O_4$ | 5.96 | 0.39 |
| CaO | 1.40 | 0.07 |
| MgO | 0.95 | 0.63 |
| $K_2O$ | 0.95 | 0.81 |
| $Na_2O$ | 0.50 | 0.40 |
| $SO_3$ | 1.50 | 0.08 |
| $P_2O_5$ | 0.18 | 0.12 |
| Carbon | 5.00 | 1.86 |
| TOTAL | 100.00 | 100.00 |

The processed pozzolan advantageously exhibits a pozzolanic activity with portland cement at 28 days of 102 percent of the control in comparison to the 86 percent pozzolanic activity exhibited by the raw pozzolan.

The overall residence time required for acid leaching of the ash is in the range of 45 minutes to 2 hours. A temperature range of 70° to 110° C. is possible with near atmospheric leach tank pressures (e.g., from about 10-20 psia) with temperatures of from about 90° to 99° C. being preferred. Free acid normalities of 3 to 8 are preferably maintained in the leach tanks, with the acid normality of the leach solution in the last leach zone in the series being in the range of from about 5 to 9 normal, and preferably being about 8 normal. The optimum normality for leaching may differ from ash to ash but may be determined by one skilled in the art.

The depth of extraction of aluminum from fly ash is dependent on variables such as the alkali content of the ash, the temperature of the leach solution, the residence time of the leaching step and the free acid concentration during leaching.

Figure 6:
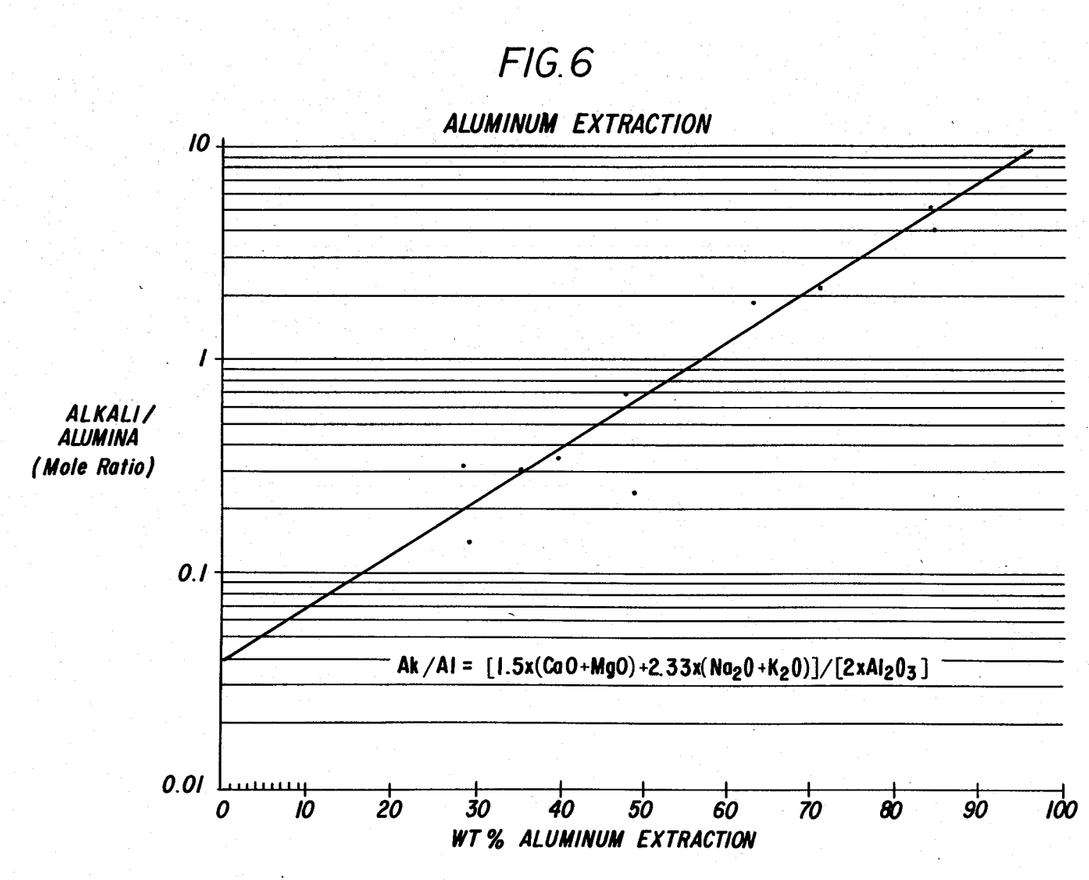
FIG. 6 is a graphical depiction of the relationship between the ash alkalinity content and the extent of aluminum extraction possible with hydrochloric acid.

The alkali content of the ash provides the greatest effect upon the aluminum extraction during leaching. High alkaline ashes contain more soluble alumina-containing-minerals than does an ash of low alkalinity. With low alkalinity ashes, refractory mullite ($3Al_2O_3.2SiO_2$) is formed. As a consequence of alkalinity, the extraction of aluminum could be as low as 10 percent for some ashes and as high as 80 percent for others. FIG. 6 shows the correlation that exists between the alkalinity content of the ash versus the extent of aluminum extraction possible with HCl. The correlation reflects the molar relationship of the alkali oxides; calcium, magnesium, potassium, and sodium to alumina. An increase in the ratio of alkali oxides to alumina results in increased aluminum extraction.

Within the acid leach unit, cenospheres 12 recovered from separation zone 6 are leached with hydrochloric acid 100 in a separate leach zone 14, skimmed from the surface of the tank, washed in zone 98, and dried at zone 99 to yield a saleable cenosphere product 101. Certain cenospheres contain iron and the leaching step removes iron, rendering the cenospheres more conducive for certain uses where an inert material is required such as an industrial filler. A comparison of the composition of raw cenospheres and acid-leached cenospheres 101 as recovered is shown in Table 4 below:

TABLE 4
TYPICAL CENOSPHERE ANALYSIS

| Component Wt. % | Untreated Cenospheres | Acid Leached Cenospheres |
|---|---|---|
| $SiO_2$ | 55.76 | 67.88 |
| $Al_2O_3$ | 26.06 | 25.06 |
| $TiO_2$ | 1.01 | 1.22 |
| $Fe_2O_3$ | 5.05 | 1.70 |
| $Fe_3O_4$ | 6.26 | 2.19 |
| CaO | 1.42 | 0.00 |
| MgO | 1.01 | 0.73 |
| $K_2O$ | 1.01 | 0.73 |
| $Na_2O$ | 0.61 | 0.49 |
| $SO_3$ | 1.61 | 0.00 |
| $P_2O_5$ | 0.20 | 0.00 |
| TOTAL | 100.00 | 100.00 |

The leachate 102 from the first leach zone, which leachate contains aluminum, iron and other metal chlorides, is processed via an ion exchange resin in zone 104 for removal of ferric (Fe+++) chloride. The ferric chloride is retained on the ion exchange resin to the exclusion of aluminun chloride also present in the leachate. More specifically, by use of an anionic resin and excess hydrochloric acid, the ferric chloride is converted to a negatively charged ion as follows:

$$FeCl_3 + HCl + H_2O \rightarrow FeCl_3.Cl^- + H^+ + H_2O$$

The ionized ferric chloride ($FeCl_3.Cl^-$) attaches to the resin anion and thus is removed from the leach liquor. Periodically, the ion exchange resin may be taken off stream and regenerated with water or a weak HCl (5% HCl) solution 106. The iron chloride-rich solution 108 is then fed to a multiple effect evaporator 110 to yield both water vapor 112 which may be condensed and used for process water and a concentrated ferric chloride solution 114 that is suitable for use in water treatment or which may be further processed in an iron hydrolysis unit 116 for production of ferric oxide 118 and the recovery of hydrochloric acid 120.

The ferric oxide product is of high purity and can be used in paint pigments. A typical iron oxide analysis from such processing is shown in Table 5:

TABLE 5
IRON OXIDE PRODUCT ANALYSIS

| Component | WT. % |
|---|---|
| $Fe_2O_3$ | 98.82 |
| $Al_2O_3$ | 0.79 |
| CaO | 0.20 |
| $K_2O$ | 0.05 |
| MgO | 0.07 |
| FeO | 0.04 |
| NaO | 0.03 |
| TOTAL | 100.00 |

Figure 3:
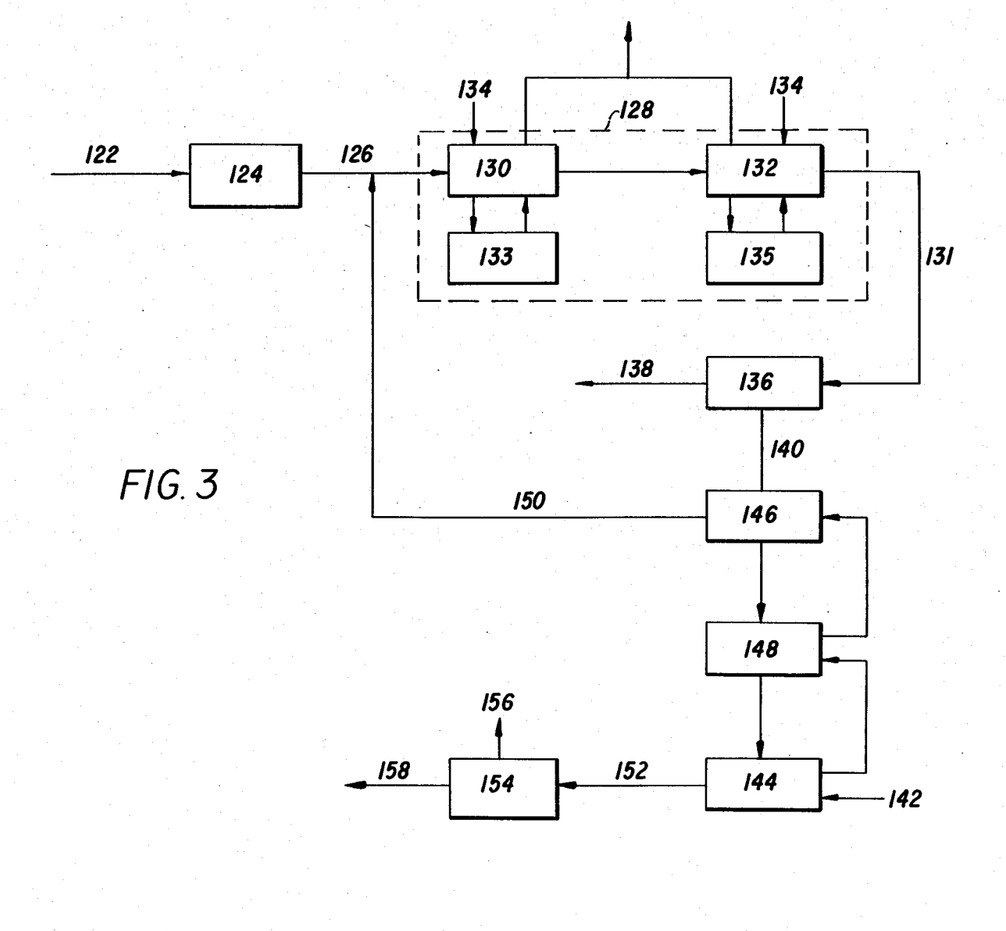

The aluminum-containing leach liquor 122 remaining upon removal of the iron chloride via ion exchange is recovered from the ion exchange unit 104 and passed to a multiple effect evaporator 124 (FIG. 3). The use of multiple effect evaporation allows for solution concentration to increase the free acid concentration of the solution prior to sparge crystallization. At the same time, it allows for recovery of water, low in HCl concentration, that can be used as process water. Evaporation of hydrochloric acid solutions, low in HCl concentration, can yield a water vapor with very minute quantities of HCl. The reason for this is that HCl is very soluble in water, and so exerts a very low vapor pressure when in concentrations from 0 to 20 weight percent. For example, at 100° C. the partial pressure of HCl over a 10 weight percent HCl solution is only 2.9 mm of Hg. compared to water at 510 mm of Hg. The multiple effect evaporator is operated at conditions sufficient to yield a 10 to 15 weight percent HCl acid leach solution 126. The operating temperature of the effects will normally be below 100° C. and the operating pressure below atmospheric pressure (i.e., less than 14.7 psia). This solution may then be fed to a sparge crystallization unit 128.

Figure 7:
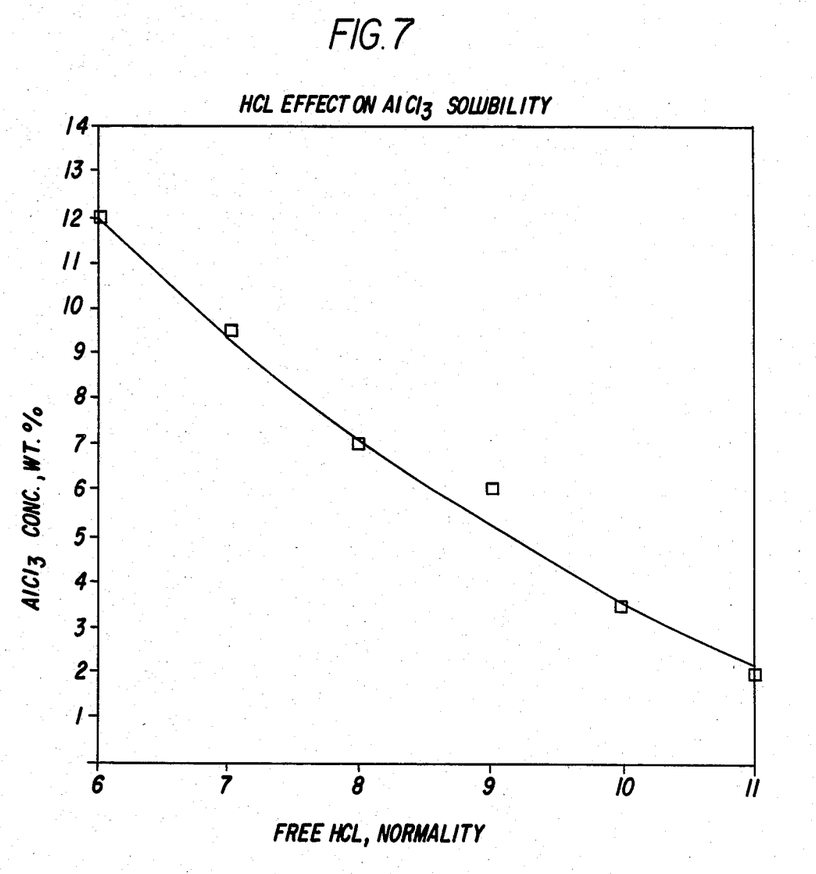
FIG. 7 is a graphical depiction of the relationship between free acid concentration and aluminum chloride solubility in hydrochloric acid solutions.

The sparge crystallization unit consists of two sparge crystallizers 130, 132 in series, with anhydrous HCl 134 being sparged into each crystallizer. The free acid normality of the second crystallizer 132 is maintained at a normality in the range of about 9 to 11, and preferably at about 11N; the free acid normality of the first unit 130 may vary, but is normally in the B 8 to 10 normal range. By sparging the aluminum chloride-containing solution with anhydrous hydrochloric acid gas, the following exothermic reaction occurs:

As the free acid normality increases in the sparged solution, the solubility of aluminum chloride is reduced, thus effecting increased yields of aluminum chloride hexahydrate crystals. FIG. 7 shows the effect of free acid normality on the solubility of aluminum chloride in HCl solutions at 65° C. The formation of aluminum chloride hexahydrate crystals is exothermic. Thus, the slurry from each sparge vessel is cooled, at heat exchangers 133, 135, with the transferred heat being used as a heat source for the iron chloride and waste metals multiple effect evaporators. The sparging takes place at near atmospheric pressure (e.g., at about 10-20 psia) and at temperatures of from about 60° to 80° C.

Aluminum chloride hexahydrate ($AlCl_3.6H_2O$) crystals and acid solution from the first sparge unit 130 are passed to the second sparge unit 132 where additional HCl gas 134 is sparged into the slurry to increase the free acid normality to, for example, about 11 normal to facilitate increased precipitation of $AlCl_3.6H_2O$ crystals. The crystals and solution 131 from the second sparge unit 132 flow to a thickener 136 where the crystals are allowed to settle out to a concentration of about 50 to 65 weight percent solids. The solution 138 from the thickener is passed to an HCl recovery unit and the crystal solids slurry 140 is passed to a counter-current wash zone.

Since $AlCl_3.6H_2O$ is soluble in solutions of low acid concentration, the wash media 142 used is a 32 weight percent HCl solution. The HCl wash solution is fed to a downstream filter 144 and caused to flow counter-current to the flow of the crystals through a series of wash zones and thickener operations 144, 146, 148. This counter-current wash operation lowers impurity levels in the filtered aluminum chloride hexahydrate crystals. The wash-thickener operation will normally consist of two to four wash-thickeners operated in series. The solution 150 from the first wash thickener may be recycled to the sparge unit 128.

The filtered $AlCl_3.6H_2O$ crystals 152 may then be fed to an alumina dryer/calciner operation 154 where waters of hydration and HCl solution are removed in a drying step at temperatures in the range of from about 260° to 550° C. as follows:

The produced aluminum chloride tri-hydrate ($AlCl_3.3H_2O$) crystals are then calcined to yield alumina as follows:

Desirably, off-gas from the calciner may be used as the heat source. The calcination of alumina takes place at 800° C. to 1200° C. in order to reduce the aluminum and all other trace metal chlorides to their oxide state. Typical product purity for the produced alumina 158 from such processing is shown in Table 6:

TABLE 6
ALUMINA PRODUCT ANALYSIS

| Component | WT. % |
|---|---|
| $Al_2O_3$ | 99.88 |
| $Fe_2O_3$ | 0.01 |
| CaO | 0.05 |
| MgO | 0.01 |
| $K_2O$ | 0.02 |
| $Na_2O$ | 0.03 |
| TOTAL | 100.00 |

Spent HCl gas 156 and HCl solution 120, 138 from iron oxide hydrolysis, sparge crystallization, alumina drying/calcining and system vents may be passed to an HCl recovery unit. Distillation and multiple effect evaporation and hydrolysis may be utilized to provide a 100 percent anhydrous HCl gas, a 32 weight percent HCl solution and a waste metal oxides stream.

The anhydrous HCl gas and HCl solution may be recycled to the process and the waste metal oxides either slurried with water and pumped to a waste pond or disposed of in dry form. Hydrochloric acid makeup, to replace process losses, is normally made up in the form of a 32 weight percent HCl solution. However, weaker or stronger solutions or gases could be used or formed as required.

The detailed description set forth is the preferred embodiment of the method of the present invention. However, certain changes may be made in carrying out the above method without departing from the scope of the invention. It is therefore intended that all matter contained in the above description shall be interpreted as illustrative and not in a limited sense. It is also to be understood that the following claims are intended to cover all of the generic and specific features of the invention herein described, and all statements of the scope of the invention, which as a matter of language, might be said to fall therebetween.

We claim:

1. A method for the recovery of mineral values from ash derived from coal gasification and combustion which ash contains carbon, magnetite, cenospheres and mineral values including aluminum and iron, said method comprising the steps of:

(a) screening said ash to provide a first carbon and cenosphere-containing ash fraction which contains the major portion of the cenospheres and carbon present in the ash as well as mineral values and a second ash fraction;

(b) separating and recovering cenospheres from said first ash fraction to yield a mineral value and carbon-containing ash fraction;

(c) removing and recovering said carbon from said carbon-containing ash fraction by froth flotation to separate said carbon from mineral values contained in said fraction;

(d) subjecting the mineral value-containing ash fraction produced in step (c) to wet magnetic separation to yield a non-magnetic ash fraction and a magnetite-rich fraction;

(e) subjecting said second ash fraction to dry magnetic separation to produce a non-magnetic ash fraction and a magnetite-rich fraction;

(f) subjecting the magnetite-rich fraction resulting from step (e) to wet magnetic separation to yield a non-magnetic ash fraction;

(g) combining the non-magnetic ash fractions resulting from steps (d), (e) and (f) to provide a combined non-magnetic ash fraction;

(h) leaching mineral values from said combined non-magnetic ash fraction by countercurrent contact of said fraction with a hydrochloric acid solution, said leaching occurring at a temperature in the range of about 70° to 110° C. and at a pressure in the range of about 10 to 20 psia;

(i) contacting the leach solution resulting from step (h) with an ion exchange resin for removal of iron salts from said solution to provide an iron-lean leach solution and recovering said iron from said ion exchange resin in the form of an iron oxide;

(j) concentrating said iron-lean leach solution by removal of water contained therein;

(k) sparging anhydrous hydrochloric acid gas at a temperature in the range of about 60° to 80° C. and a pressure in the range of about 10 to 20 psia through said concentrated iron-lean leach solution to precipitate aluminum chloride therefrom in the form of aluminum chloride hexahydrate and recovering said aluminum chloride hexahydrate;

(l) washing, drying and calcining said recovered aluminum chloride hexahydrate to yield alumina;

(m) washing leached ash produced in said countercurrent leaching step by countercurrent contact with water and recovering said washed ash;

(n) drying said washed ash to provide an acid-leached pozzolan;

(o) leaching mineral values from the cenospheres recovered in step (b) with an aqueous leach solution of hydrochloric acid; and (p) recovering said leached cenospheres from said leach solution, washing said recovered cenospheres and drying said recovered cenospheres.

2. The method of claim 1 wherein the mineral value-containing ash fraction produced in step (c) is wet ground prior to wet magnetic separation.

3. The method of claim 2 wherein the fractions produced in step (c) is wet ground to a size in the range of 100 percent −200 Tyler mesh to 100 percent −325 Tyler mesh.

4. The method of claim 1 wherein ferric chloride is removed from the leach solution by contact of same with an ion exchange resin in step (i).

5. The method of claim 4 wherein said ferric chloride is removed from said ion exchange resin by washing, with said ferric chloride being subjected to iron hydrolysis to yield iron oxide.

6. The method of claim 1 wherein said aluminum chloride hexahydrate from step (k) is washed with a hydrochloric acid solution to remove other soluble metal chlorides.

7. The method of claim 1 wherein the non-magnetic ash fraction resulting from step (g) is reduced in water content prior to being leached in step (h).

8. The method of claim 7 wherein the ash fraction is reduced in water content by thickening and centrifuging.

9. The method of claim 1 wherein the magnetite-rich fractions resulting from steps (d) and (f) are dried to yield magnetite.

10. The method of claim 1 wherein a series of countercurrent leach steps are employed in step (h).

11. The method of claim 10 wherein ash leachate from each leach step is clarified to increase the solids content of the leachate prior to passage to the next downstream leach step.

12. The method of claim 11 wherein the ash leachate is clarified to increase the solids content to approximately 60 percent by weight.

13. The method of claim 11 wherein the clarified solution resulting from the clarification step is passed to the next upstream leach step to serve as the leaching solution.

14. The method of claim 1 wherein the hydrochloric acid leach solution which is employed in the last leach step in the series is approximately 8N.

15. The method of claim 1 wherein a series of countercurrent wash steps are employed in step (m).

16. The method of claim 15 wherein said leached ash is washed in said series of countercurrent wash steps to an extent sufficient to yield a solution containing from about 0.5 to 3.0 percent by weight of metallic salts.

17. The method of claim 1 wherein said acid leaching in step (h) occurs at a temperature in the range of from about 90° to 99° C.

18. The method of claim 1 wherein the leach solution employed in step (h) has a free acid normality in the range of about 3 to 8N.

19. The method of claim 1 wherein said ash is screened to provide a first ash fraction which contains at least about 90 percent by weight of the cenospheres present in the ash and at least about 60 percent by weight of the carbon present in the ash.

* * * * *